G. F. WARNER.
CULTIVATOR.
APPLICATION FILED JAN. 14, 1920.
1,429,384.
Patented Sept. 19, 1922.
4 SHEETS—SHEET 3.
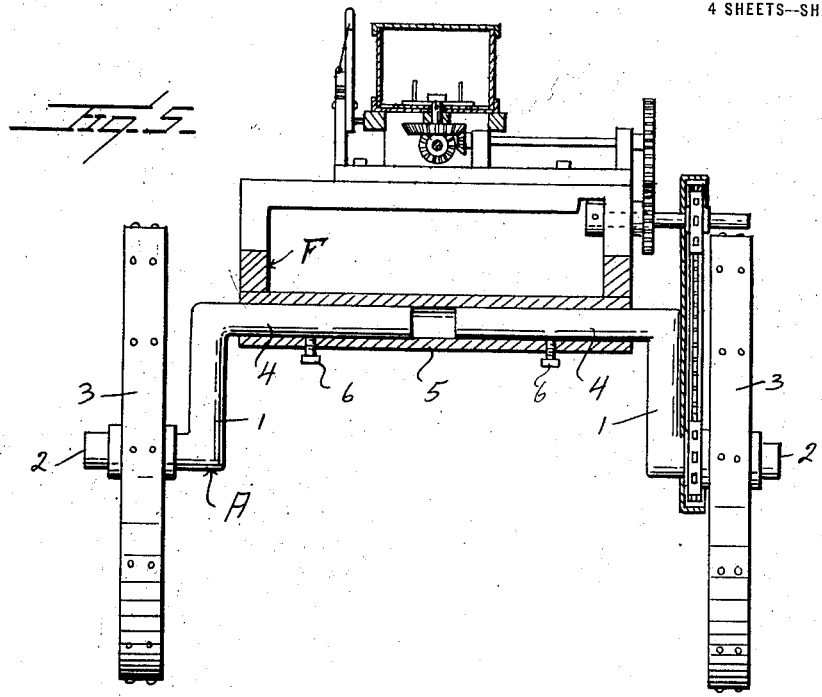
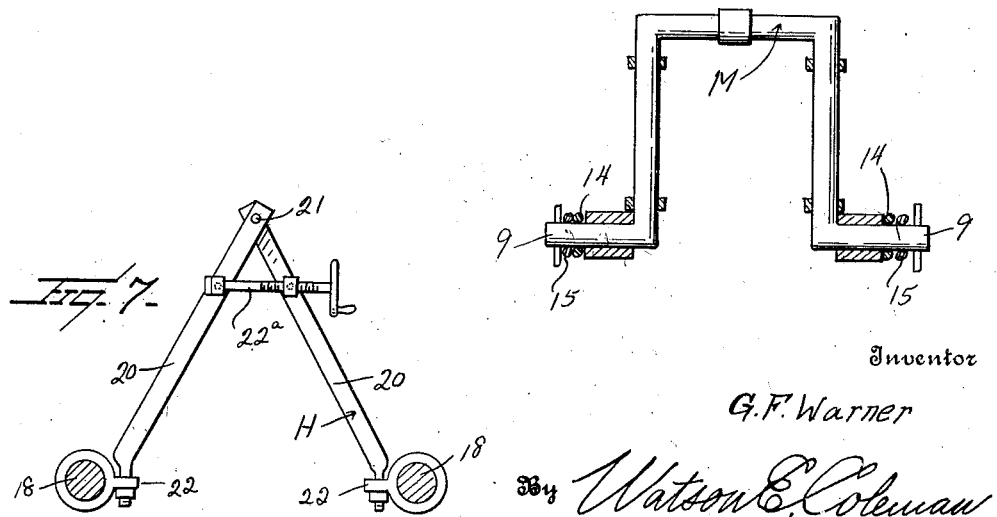

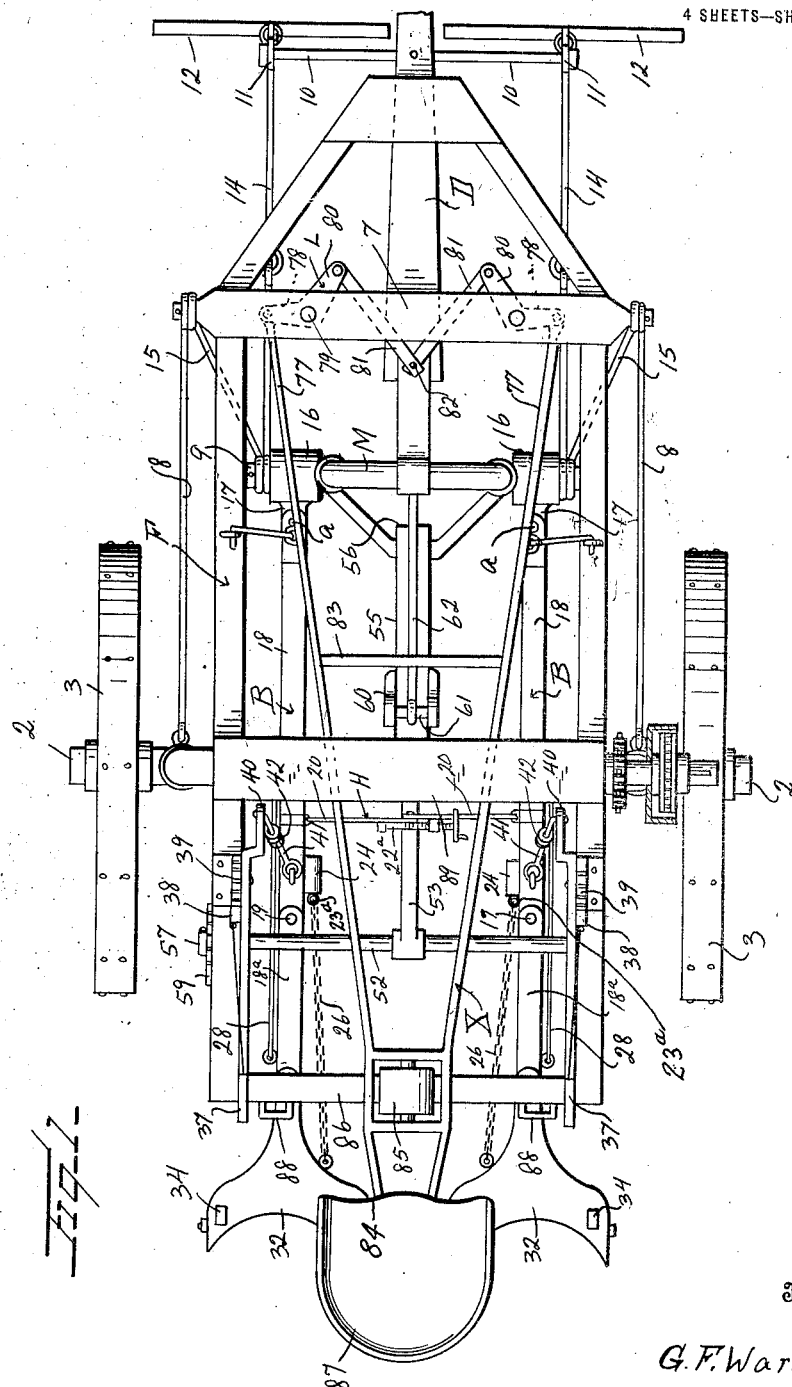

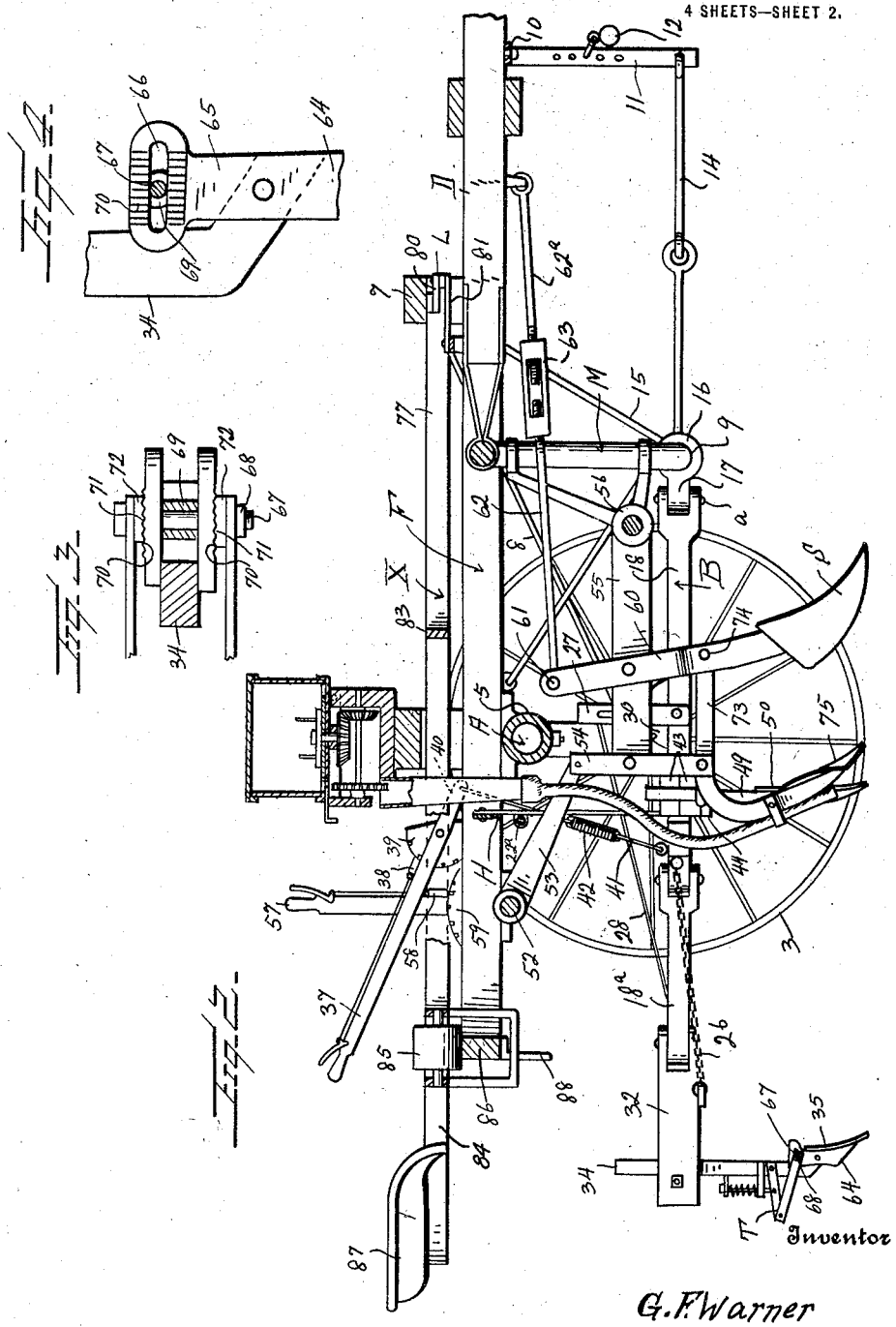

G. F. WARNER.
CULTIVATOR.
APPLICATION FILED JAN. 14, 1920.
1,429,384.
Patented Sept. 19, 1922.
4 SHEETS—SHEET 4.
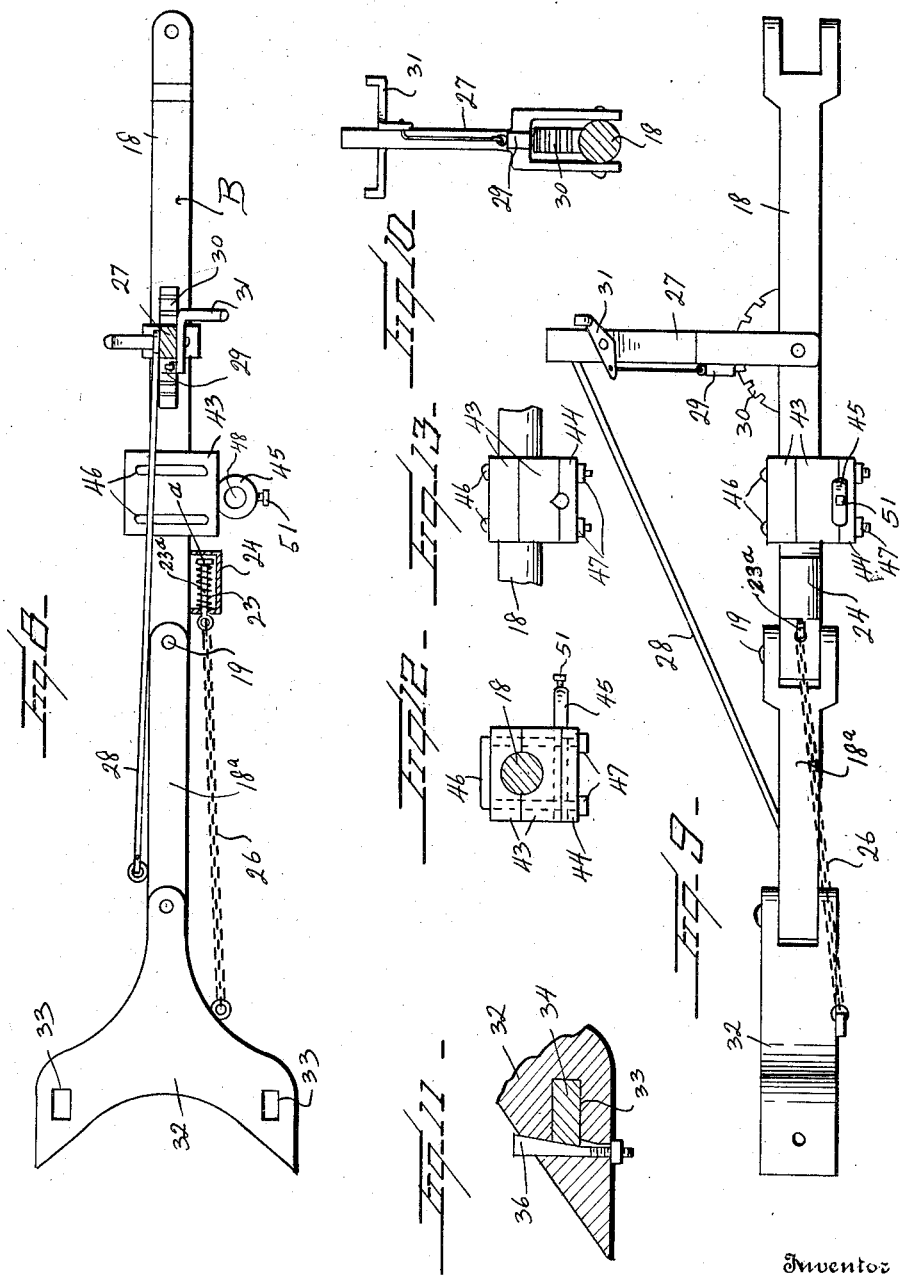
Inventor
G. F. Warner
By Watson E. Coleman
Attorney Patented Sept. 19, 1922.

1,429,384

UNITED STATES PATENT OFFICE.

GEORGE F. WARNER, OF ENNIS, TEXAS.

CULTIVATOR.

Application filed January 14, 1920. Serial No. 351,317.

*To all whom it may concern:*

Be it known that I, GEORGE F. WARNER, a citizen of the United States, residing at Ennis, in the county of Ellis and State of Texas, have invented certain new and useful Improvements in Cultivators, of which the following is a specification, reference being had to the accompanying drawings.

This invention relates to certain improvements in cultivators, and has relation more particularly to a device of this general character of a straddle row type, and which is wheel supported, and it is an object of the invention to provide a novel and improved device of this general character.

It is also an object of the invention to provide a novel and improved device of this general character embodying means whereby the gang plows may be shifted laterally with respect to the path of travel of the implement or machine, so that the operator has effective control to permit the desired following of the row without covering or plowing up plants that may be at one side of the row.

It is also an object of the invention to provide a novel and improved device of this general character wherein each gang of plows is carried by an articulated beam normally maintained in longitudinal alignment, together with means under control of the operator for swinging the rear or plow carrying portion of the beam laterally.

The invention consists in the details of construction and in the combination and arrangement of the several parts of my improved cultivator whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in top plan of a cultivator constructed in accordance with an embodiment of my invention the draft pole being shown in fragment.

Figure 2 is a longitudinal vertical section taken through the device as illustrated in Figure 1;

Figure 3 is a fragmentary view partly in top plan and partly in section illustrating in detail the mounting of a foot 64;

Figure 4 is a fragmentary view partly in elevation and partly in section of the structure disclosed in Figure 3;

Figure 5 is a view partly in rear elevation and partly in section of the device herein disclosed, certain of the parts being omitted for clarity in disclosure;

Figure 6 is a fragmentary view partly in elevation and partly in section of the arch member carried by the rear portion of the draft pole with the parts concomitant thereto;

Figure 7 is a fragmentary view partly in section and partly in elevation of the hobble herein employed;

Figure 8 is a view partly in top plan and partly in section of one of the beams B as herein embodied;

Figure 9 is a view in side elevation of the structure illustrated in Figure 8;

Figure 10 is a fragmentary view partly in elevation and partly in section illustrating the foot lever carried by each of the beams B;

Figure 11 is a fragmentary view partly in horizontal section and partly in top plan illustrating the mounting of a shank 34;

Figure 12 is a fragmentary view partly in section and partly in elevation illustrating the means herein embodied for securing a shank 49 in working position;

Figure 13 is a view in side elevation of the structure illustrated in Figure 12.

As disclosed in the accompanying drawings, A denotes an arched axle comprising two substantially duplicate side members 1, provided at their lower extremities with the outstanding spindles 2, on each of which is journaled a wheel 3. The upper end portions of the members 1 are provided with the inwardly directed extensions or arms 4, which telescope within the opposite end portions of an elongated tubular member or sleeve 5. Threaded through the opposite end portions of the member or sleeve 5 are the binding screws 6 or the like, which co-act with the extensions or arms 4 to hold the same in a fixed position with respect to the member or sleeve 5. By this structure the axle A may be lengthened or journaled as required by practice, so that my improved device can be employed in connection with the narrow or wide rows.

Suitably engaged with the sleeve 5 is the frame F extending a desired distance in front and to the rear of the axle A. The forward portion of the frame F is provided with a transversely disposed member or beam 7 extending beyond opposite sides thereof, and interposed between the end portions of said beam or member 7 and the lower portions of the intermediate portions of the sections 1 of the axle A are the brace members 8. D denotes a draft tongue having its inner or rear end portion slidably disposed through the forward end of the frame F, and extending inwardly of said frame. The rear or inner end portion of the draft pole D is clamped or otherwise secured to the central portion of an arched member M, provided with the outwardly and laterally disposed spindles 9.

10 denotes a double-tree suitably engaged with the draft pole D in advance of, but in close proximity to the forward end of the frame F and depending from the opposite extremity of the double-tree 10 are the bars or rigid links 11, to each of which is suitably affixed a single-tree 12. Connecting the lower end portion of each of the bars or links 11 and the outer extremity of the adjacent spindle 9 is an articulated rod 14, so that in practice draft will be imposed upon the arched member M directly from the team, and which is of particular advantage when the gang plows are in working position. Interposed between the outer extremity of each of the spindles 9 and the adjacent end portion of the member or beam 7 is a rod 15 which operates to brace the member M when the implement or machine is in operation.

Mounted upon each of the spindles 9 is a hub 16 provided with the rearwardly disposed lug or arm 17. Pivotally engaged, as at $a$, with said lug or arm 17 about a vertical axis is the forward end portion of the gang plow beam B. The beam B is articulated, and preferably comprises two sections 18 and $18^a$, having their adjacent end portions pivotally connected, as at 19, about a vertical axis whereby the section $18^a$ is capable of lateral swinging movement independently of the section 18. The beam B in its entirety is also capable of lateral swinging movement, as permitted by its pivotal connection $x$.

Operatively engaged with the sections 18 of the beams B is a hobble H comprising two elongated members 20 having similar ends pivotally connected as at 21, with the opposite end portions connected, as at 22, with the sections 18 of the beams B. Coacting in a well known manner with the members 20 is an operating member $22^a$ whereby the members 20 of the hobble H may be adjusted one with respect to the other to correspondingly adjust the sections 18 of the beams B, as the necessities of practice may require, and said operating member also operates to hold the sections 18 of the beams B in their requisite relative arrangement. This relative adjustment of the members 20 is permitted by having sufficient play in the connections 22.

The sections 18 and $18^a$ of each of the beams B are normally maintained substantially in longitudinal alignment through the instrumentality of a coil spring 23 of requisite tension. The spring 23 is substantially confined within a housing 24, secured to the inner side of the section 18. The spring 23 encircles a shank $23^a$ slidably disposed through the inner end of the housing 24 and said spring is interposed between said inner end of the housing 24 and the enlargement or head $a$ carried by the inserted end portion of the shank $23^a$. The outer end portion of the member $23^a$ is engaged with a flexible member 26, preferably a link chain, and which member is also engaged with the head 32 of the section $18^a$ at a desired point beyond the pivotal connection 19 of the sections 18 and $18^a$.

The connection $18^a$ is adapted to be manually swung outwardly or laterally, as may be required, and as herein disclosed this manual operation is accomplished through the medium of a foot lever 27 supported by the section 18, and which lever is operatively engaged, as at 28, with the outer side of the section $18^a$. Upon depressing the lever 27 the section 18 will swing outwardly and laterally, as may be required.

The lever 27 is provided with a latch mechanism 29, which is normally in working engagement with the rack 30 carried by the section 18. The latch mechanism 29 includes an operating member 31, preferably adapted to be moved by the foot for disengaging the latch mechanism 29 from the rack 30, so that the section $18^a$ may automatically be returned to its normal position with respect to the section 18.

Rigidly secured to the outer end portion of the section $18^a$ of each of the beams B is a head 32, extending in a horizontal direction beyond opposite sides of the section $18^a$. The opposite side portions of the head 32 are provided with the vertically directed openings 33, in each of which is adapted to be engaged the shank 34 of a shovel plow 35 or the like. The shank 34 is properly held to the head 32 through the means of a wedge 36 extending into the opening 33 from within, and having clamping action upon the shank.

Each side member of the frame F adjacent the rear thereof is provided with a lever 37, provided with a latch mechanism 38 coacting with a rack 39 carried by the frame. The pivoted end portion of the lever 37 is provided with a forwardly directed extension 40 with which is engaged a flexible member 41 which is also connected to the section 18 of the adjacent beam B. Interposed in the connection 41 is a spring 42. The lever 37 and the connection 41 operate to regulate the extent of penetration of the plows carried by the beam B, and also operate to maintain the beam B and the plows carried thereby in an inoperative position, and particularly when the implement or machine is being transported.

The section 18 of each of the beams B has clamped thereto from above and below, the plates or blocks 43, and coacting with the lower plate 43 is another clamping plate 44 for holding in applied position an eye member 45. Common to the plates or blocks 43 and 44 are the clamping members 46 with which coact in a conventional manner the nuts or burrs 47 engaging the inner face of the plate 44. Disposed through the eye 48 of the bolt 45 is the shank 49 carrying the plow 50, and said shank is maintained in desired ajustment through the means of a clamping screw 51 threaded through the eye, and bearing against the shank.

Extending transversely of the rear portion of the frame F and supported for rocking movement is a shaft 52 to the central portion of which is engaged the rearward end portion of the forwardly directed rock arm 53. Pivotally engaged with the forward portion of the rock arm 53 is a depending arm 54, being pivotally engaged intermediate its length with a forwardly directed arm 55 mounted for rocking movement in a vertical direction. The forward portion of the arm 55 is provided with a hub 56 mounted upon the central portion of a supporting member connecting the side arms of the member M.

One end portion of the shaft 52 has fixed thereto an upstanding lever 57 carrying a latch mechanism 58 coacting with the rack 59, suitably mounted upon the adjacent side member of the frame F. The lever 57 is operated to vertically rock the lock arm 53, as the occasions of practice may require, and particularly to regulate or control the plow S, to be hereinafter more particularly referred to.

Pivotally engaged intermediate its length with the central portion of the arm 55 is a standard 60, and the upper end portion of said standard 60 is pivotally engaged, as at 61, with the rear end portion of the elongated arm 62 extending longitudinally of the frame. The forward end portion of the arm 62 is in threaded engagement with a turn buckle 63. The turn buckle 63 also is in threaded engagement with the rear end portion of an arm or rod 62ª. The opposite end portion of this arm or rod 62ª is suitably engaged with the rear portion of the pole D. By turning the buckle 63 the standard 60 may be readily adjusted or regulated in order to set the plow S carried by said standard 60, as may be required when in working position, or to maintain it in a raised position.

Pivotally engaged with the lower portion of the standard 34 is a foot 64 with which the plow 35 is adapted to be engaged, in a conventional manner. The foot 64 is provided with the upstanding and transversely spaced arms 65 provided in their upper portions with the slots 66, through which is directed a bolt 67 having coacting therewith a nut 68. The bolt 67 is also directed through a spacing sleeve 69 interposed between the arms 65. The outer faces of the arms 65 adjacent the slots 66 are provided with the teeth 70 which mesh with the tooth faces 71 of the blocks 72, and through which the bolt 67 is also directed. By this means the foot 64 may be effectively locked in a raised position or in a position to engage the soil.

Coacting with the foot 64 is a trip mechanism T of a well known type, so that in the event the plow 35 comes into contact with an abnormal obstruction, such as roots or stumps, the plow 35 and the foot 64 will be permitted to have the requisite movement to offset the resultant jar.

Pivotally supported by the arm 54 is a colter beam 73, having its forward end portion pivotally engaged, as at 74, with the standard 60. The opposite end portion of the beam 73 has suitably affixed thereto the ground working members 75.

X denotes a shifting frame embodying at its forward portion two substantially parallel side members 77, each pivotally engaged at its forward end portion with an arm 78 of a bell crank lever. The bell crank lever L at its heel is pivotally supported as at 79, for swinging movement about a vertical axis by the member or beam 7. The second arm 80 of each lever L is pivotally engaged with a rearwardly directed link 81 pivotally engaged at its opposite end, as at 82, about a vertical axis with the upper face of the rear portion of the draft pole or tongue D, whereby it will be readily seen that upon movement of the pole or tongue D in one direction, the frame X will be moved in unison therewith, but in an opposite direction.

The side members 77 substantially midway their ends, are connected by the transverse beam 83, and said side members are continued by the rearwardly converging side members 84. The side members 77 adjacent the members 84 are connected by the cross members 84'. The members 84' rotatably support a roller 85, which rides upon the rear cross member 86 of the frame F. The portions 84 extend rearwardly of the frame F, and such extended portion has mounted thereon a seat structure 87 of an ordinary or preferred type.

The cross member 86 at opposite sides of the frame X is provided with the foot rests 88, so that the operator, when occupying the seat structure 87 may swing the frame X laterally in either direction, as the occasions of practice may require.

When the frame X is shifted laterally, the connection thereof at its forward portion with the draft pole or tongue D results in the beams B being also laterally adjusted, so that the gang plows can be properly adjusted with respect to the line of the draft of the implement or machine to permit the desired following of the row without plowing or covering up plants that may be at one side of the row.

Engaged with each of the side members 77 is a hook member 89 which coacts with a keeper or eye member 90 carried by the adjacent side member of the frame F. The hook members 89 and keepers or eye members 90 coact to lock the frame X against shifting movement and which is of particular advantage when the machine is working in land full of stumps and roots, as the beams B are held against movement from the frame X.

From the foregoing description it is thought to be obvious that a cultivator constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:

1. A machine of the class described comprising a portable frame, a rock arm carried thereby, a depending arm pivotally engaged therewith and depending therefrom, a vertically swinging arm carried by the frame and in pivotal engagement with the depending arm, a ground working element operatively connected with said vertically swinging arm, a standard pivotally engaged with the vertically swinging arm, a rod pivotally engaged with an end portion of the standard, a second rod secured at one end portion to the frame, and a turn-buckle connecting the adjacent end portions of the rods and operating to adjust the standard about its pivot.

2. A machine of the class described comprising a portable frame, a rock arm carried thereby, a depending arm pivotally engaged therewith, an arm carried by the frame and in pivotal engagement with the depending arm, said second named arm having swinging movement in a vertical plane, a ground working element operatively connected with said vertically swinging arm, a standard pivotally engaged with the vertically swinging arm, and means for imparting swinging movement to the standard independently of the vertically swinging arm.

3. A machine of the class described comprising a portable frame, a rock arm carried thereby, a depending arm pivotally engaged therewith, a vertically swinging arm carried by the frame and in pivotal engagement with the depending arm, a ground working element operatively connected with said vertically swinging arm, a standard pivotally engaged with the vertically swinging arm and means for imparting swinging movement to the standard independently of the vertically swinging arm, said standard having swinging movement in a vertical plane.

4. A machine of the class described comprising a portable frame, a member supported by the frame, a rock arm carried by the frame, an arm pivotally engaged with said rock arm for swinging movement in a vertical plane, a second arm pivotally supported by the member for swinging movement in a vertical direction, both of said arms being pivotally connected, and a ground working element operatively connected with the second arm.

5. A machine of the class described comprising a portable frame, a member supported by the frame, a rock arm carried by the frame, an arm pivotally engaged with said rock arm for swinging movement in a vertical plane, a second arm pivotally supported by the member for swinging movement in a vertical plane, both of said arms being pivotally connected, a standard supported by the second arm for swinging movement in a vertical plane, a ground working element carried by the standard, and means for swinging the standard to adjust the position of the ground working element carried thereby.

6. A machine of the class described comprising a portable frame, a rearwardly directed beam carried thereby and including sections pivotally connected for relative swinging movement, ground engaging elements carried by the sections, automatic means for normally maintaining the sections substantially in alinement, and manually operated means for imparting lateral swinging movement to one of said sections, said last named means also serving to maintain the sections substantially in alignment.

7. A machine of the class described comprising a portable frame, a rearwardly directed beam carried thereby and including sections pivotally connected for relative swinging movement, ground engaging elements carried by the sections, automatic means for normally maintaining the sections substantially in alinement, and manually operated means for imparting lateral swinging movement to one of said sections, said last named means also serving to maintain the sections substantially in alignment, said last named means including a mechanism for maintaining said last named section in different lateral positions.

In testimony whereof I hereunto affix my signature.

GEORGE F. WARNER.